Sept. 12, 1961 E. HAHN ET AL 2,999,437
PHOTOGRAPHIC SHUTTERS
Filed Oct. 10, 1957 3 Sheets-Sheet 1

INVENTORS
ERICH HAHN
WERNER HAHN
ROLF NOACK

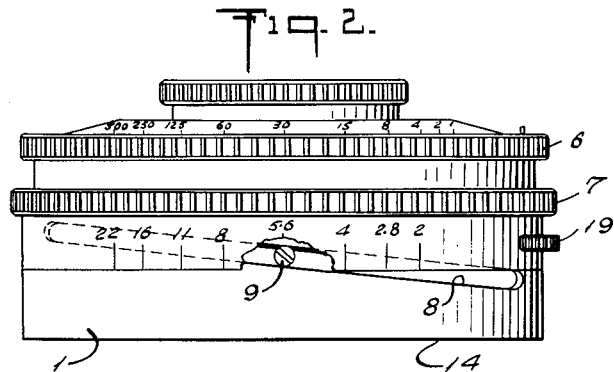
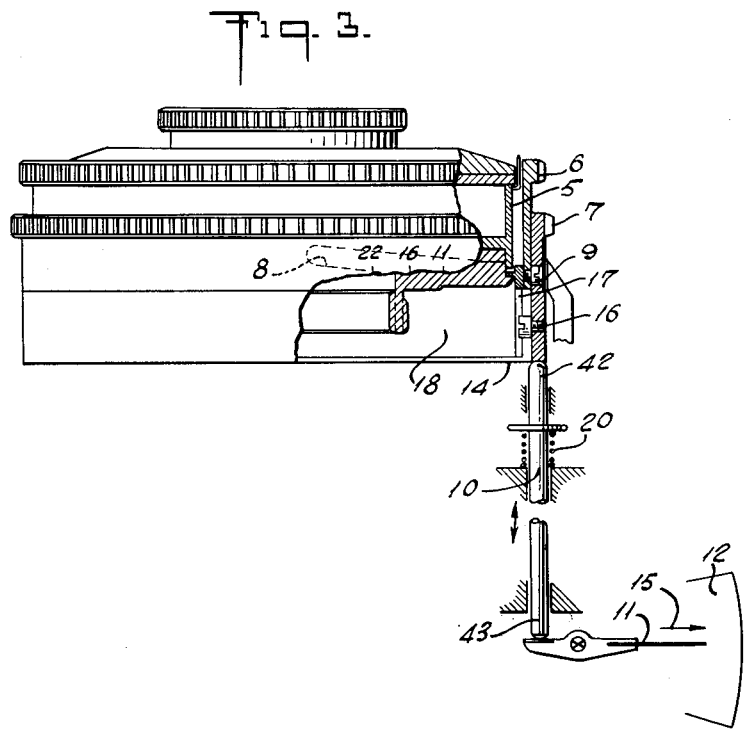

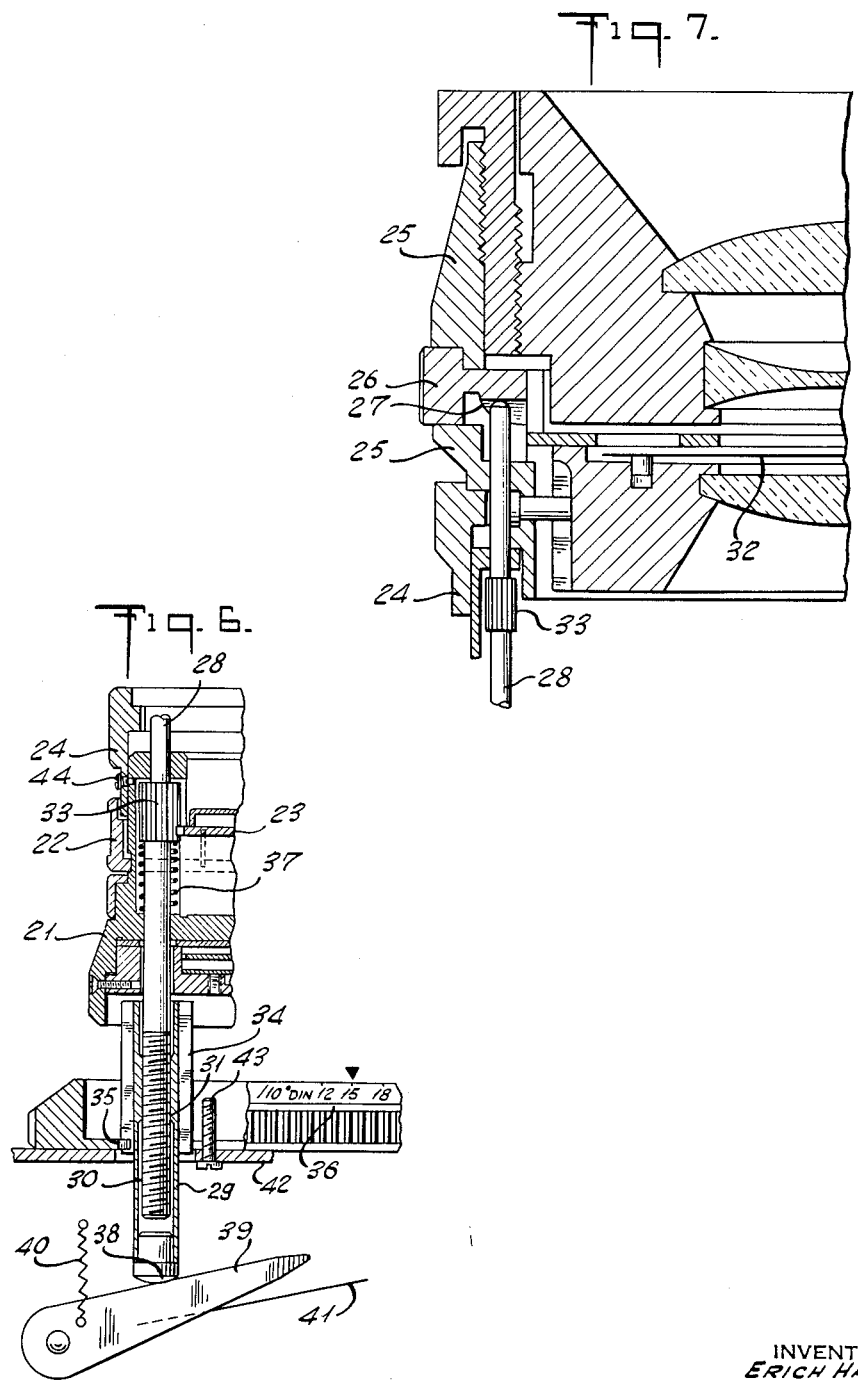

United States Patent Office 2,999,437
Patented Sept. 12, 1961

2,999,437
PHOTOGRAPHIC SHUTTERS
Erich Hahn, Werner Hahn, and Rolf Noack, Dresden, Germany, assignors to VEB Kamera- und Kinowerke Dresden
Filed Oct. 10, 1957, Ser. No. 689,428
9 Claims. (Cl. 95—10)

This invention relates to photographic shutters and more particularly to shutters having setting means for setting the exposure factors, i.e., the factors determining proper exposure, which setting means are functionally and operatively coupled with each other and function as addition quantities or magnitudes in a summation mechanism.

Such measures and mechanisms are necessary in cameras, wherein either a separate light value scale is provided on the shutter, or wherein the setting means or members of the shutter are operatively connected with an exposure meter.

The hitherto known mechanical connections of setting means for the exposure factors for the purpose of adding exposure factors to arrive at a summation value determining the exposure consisted in differential gears which in turn were composed of spur gears, bevel gears or worm gears. It is obvious that the provision of mechanisms comprising such relatively complicated elements resulted in considerable additional expenditure, thus making such cameras considerably more expensive. Further, the known arrangements of the kind referred to, were not suitable and, generally, did not fulfill the requirements for cameras wherein it is desired to use interchangeable lens attachments.

Accordingly, it is an object of this invention to provide a simple, efficient and inexpensive arrangement of the kind referred to by means of which it is rendered possible to bring the sum of the exposure factor values or the individual addition magnitude values into register with the brightness or light value reading that has been ascertained, for example, by means of an exposure meter or the like.

A further object of the present invention is to provide an arrangement of the kind referred to, which is usable in or adaptable for cameras with interchangeable lens attachments.

In accordance with this invention the above mentioned objects are attained by having the setting means or rings for the exposure factors engage each other by means of screw or worm shaped cam mechanisms so that upon rotation of the rings relative to each other, a movement occurs in a portion of the cam mechanism, said movement being indicated by a vector which extends in a direction perpendicular to the plane of rotation and acts on an indicating means, e.g., a pointer or the like device. The action or effect of this vector can be utilized both for indicating the light value on a common light value scale of the camera, or also directly for controlling or actuating a follower or pointer of an exposure meter.

The invention will be more fully understood and other objects and advantages of the invention will become apparent from the following description and the drawings, in which:

FIG. 2 is a first embodiment of an arrangement in accordance with the invention;

FIG. 3 is a partial section of FIG. 2;

FIG. 6 shows a still further embodiment of the inventive arrangement; and

FIG. 7 shows an interchangeable lens attachment to be used in connection with the inventive arrangement.

Figure 1:
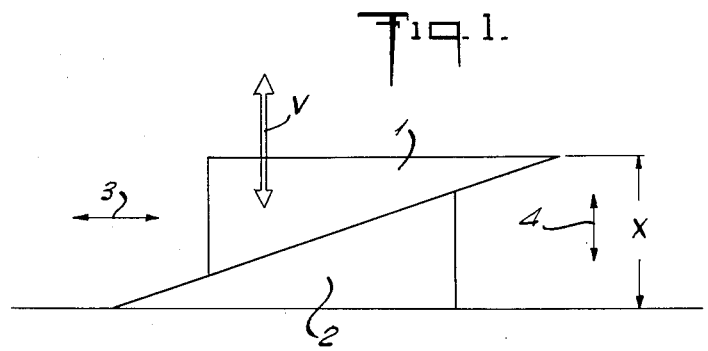
FIG. 1 is a diagrammatic presentation of the principle involved in the invention.

Referring now to the figures and in particular to FIG. 1, the differential or compensating mechanism according to this invention is constructed as a cam mechanism and is based on the principle of oppositely arranged wedges. As will be readily gathered, the value or distance X, indicated in FIG. 1, will not change and thus will be constant, if both wedges 1 and 2 do not move with respect to each other, i.e., if wedges 1 and 2 move jointly in the direction of arrow 3. Arrow 3 indicates the direction of the primary movement. However, the value or distance X will be changed as soon as the wedges 1 and 2 are moved relative to each other in the direction of the arrow 3. In the latter case, there occurs a movement of one wedge with respect to the other indicated by vector V in the direction of the arrow 4, that is in a direction perpendicular to the primary movement which causes a secondary movement of the wedge 1, the latter being freely movable in the direction of the vector V.

This principle is constructively embodied as follows:

The first embodiment of a constructional design of the principle elucidated above is shown in FIGS. 2 and 3. A time setting ring 6 and a diaphragm setting ring 7 are rotatably mounted concentrically relative to a shutter housing 5 (FIG. 3). The rings 6 and 7 are operatively in engagement with each other by the provision of a screw 9 arranged on the time setting ring 6, which screw 9 projects into and engages a slot 8 in the diaphragm setting ring 7. Due to the action of a psring 20, a push rod or plunger 10 (FIG. 3) is urged against front surface 14 of the diaphragm setting ring 7, which push rod 10 coacts with a follower 11 of an exposure meter 12. The diaphragm setting ring 7 is operatively connected with a laminated diaphragm ring structure 18 by means of a screw 16, said screw 16 engaging in a groove 17 of the diaphragm ring 18.

Upon rotating the setting rings 6 and 7 simultaneously, as will be the case when the values for the exposure time and the diaphragm setting are to be adjusted or set in the same proportion or ratio, that is under retention of the same light value, the push rod 10 merely slides along the surface 14 without affecting or actuating the follower 11. Such simultaneous rotation of the setting rings 6 and 7 may be facilitated by the provision of a coupling known per se which coupling consequently is not shown or described. It is only generally indicated by an element or knob 19 (FIG. 2) which is manually actuated and by means of which this coupling may be actuated.

Figure 4:
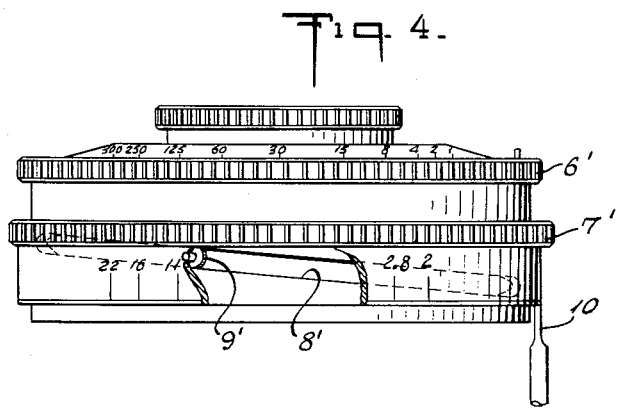
FIG. 4 shows a second embodiment of the inventive arrangement.

If, however, only one of the two setting rings 6 or 7 is moved, a displacement of the diaphragm setting ring 7 in axial direction due to the screw-slot guide 9 and 8 occurs, resulting in an actuation of the push-rod 10 and consequently of the follower 11. As soon as the follower 11 due to this secondary movement is in register with a pointer or indicator 15 of the exposure meter 12, the exposure factors are properly adjusted and set. In other words, the pointer 15 of the exposure meter 12 indicates the proper light value in accordance with which the setting means should be set and the follower 11, operatively engaged with the setting rings 6 and 7 through the element 10 is moved until it is in register with the pointer 15, whereby the proper adjustment has been made, since the setting means 6 and 7 constitute the exposure factors. It is obvious that it is of no importance which one of the setting members 6 or 7 is provided with the slot 8 and which one with the screw 9. It is, of course, possible to reverse the arrangement, as for example, shown in FIG. 4. In FIG. 4 an embodiment is shown wherein a time setting means 6' is provided with a slot 8' while a diaphragm setting ring 7' is provided with a pin 9'.

Figure 5:
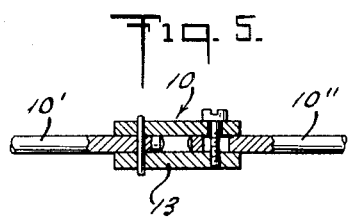
FIG. 5 shows the construction of a push-rod employed in the inventive construction.

In order to facilitate the adaptation of the exposure meter 12 to the shutter and, in particular, to the front surface 14, the push-rod 10 is advantageously constructed of two parts 10' and 10" (see FIG. 5). A sleeve or socket 13 receives one end of both parts whereby the length of the push-rod 10 can be readily adjusted according to the requirements.

In accordance with the embodiment shown in FIG. 6 a shutter housing 21 is provided with an exposure time setting ring 22 which is coupled with a gear 23. Further, on the shutter housing 21, there is rotatably mounted a lens fitting ring 24 which serves the purpose of securing interchangeable lens attachments, as for example, a lens attachment 25 as shown in FIG. 7. The lens attachment 25 is removably attached by known means (not shown) to the fitting ring 24 (see FIGS. 6 and 7). A setting member 26 for a diaphragm structure 32 of the lens 25 is mounted within a groove in attachment 25 and is provided with a control cam 27. A rod traverses the shutter housing 21 in axial direction which rod comprises a front threaded portion 28 and a rear threaded portion 29. The front threaded portion 28 has an outer thread 30 and the rear threaded portion 29 has an inner thread 31, whereby the entire rod can be extended or shortened in telescopic manner. The front threaded portion 28 carries a pinion 33 which meshes with the gear 23 while the rear threaded portion 29 is provided with a further pinion 34 which meshes with an interior toothing 35 of a setting ring 36 reflecting the film sensitivities.

The length of the pinions 33 and 34 is adjusted in such a manner that, in spite of axial displacement due to the action of the previously mentioned vector V, they remain in engagement with the gears 23 and 35. A spring 37 tends to urge the rod 28, 29 into positive engagement with the cam 27. A feeling bolt 38 which is arranged on the rear threaded portion 29 is in operative connection with a measuring mechanism known per se, which in the present embodiment is embodied by a follower 39 which latter is biased by a spring 40. The follower 39 is brought into register in known manner with a pointer 41 of the measuring mechanism.

The mode of operation of the last mentioned embodiment is the following:

The arrangement is first adjusted to the sensitivity of the film to be used by turning ring 36 to the proper value, whereby the threaded portion 29 is turned through the toothing 35. This rotational movement causes a corresponding length adjustment of the rod 28, 29 through the thread connections 30, 31. In this manner, the exposure factor resulting from the film sensitivity, i.e., the value corresponding to the film sensitivity has been added to the rod length.

Finally, it is necessary to make a proper selection of exposure time and diaphragm value in such a manner that the still missing addition factors are expressed in the form of corresponding length alterations of the rod 28, 29, so that the position of the follower 39 can be brought into register with the position of the pointer 41 of the measuring mechanism.

For the purpose of elucidating this example, let us assume that the operator desires to obtain a certain depth of field. Consequently, the desired diaphragm value is first set by turning the diaphragm setting ring 26 to the desired value, and the rod 28, 29 will be axially displaced through the cam 27. The further length adjustment of the rod required for completing the light value which has been indicated by the pointer 41, is imparted to the rod by turning the exposure time setting ring 22, whereby the gear 23 which is connected with the setting ring 22 transmits its rotational movement to the pinion 33 of the front threaded portion 28. Due to the threaded connections 30, 31, there occurs again an alteration in telescopic manner in the length of the rod composed of the threaded portions 28 and 29.

It is obviously also possible to make the follower 39 act on a light value scale provided on the shutter so as to avoid the building in of an exposure meter into the camera. The mode of operation of the summation mechanism, of course, would not be changed thereby. On the other hand, the arrangement which in the present case is adapted to serve the purpose of setting the exposure factors comprising exposure time and diaphragm value could also serve the purpose for setting the diaphragm value and the distance value, so as to eliminate the necessary mathematical calculations required for flash exposures.

We claim:

1. In a camera having a housing, a photographic exposure control mechanism comprising first exposure factor setting means including a first rotatable setting ring, second exposure factor setting means including a second rotatable setting ring, a cylindrical cam surface on one edge of said first ring, a control rod extending transversely to the plane of said first ring, means for biasing said control rod against said cam surface for axial motion in response to rotation of said first ring, a control sleeve threaded to the free end of said control rod for axial movement thereof due to axial movement of said control rod, said second setting means including coupling means connecting said control rod to said second ring for rotating said rod, means for controlling the rotation of said control sleeve whereby upon rotation of said rod said sleeve is axially moved, and indicating means responsive to the position of said sleeve, for indicating the composite positions of said setting means.

2. In a camera, a photographic exposure control mechanism according to claim 1, wherein said coupling means comprise a pair of gear wheels in meshed engagement, one of said wheels being coaxially mounted with said control rod and the other gear wheel being coaxially mounted with said second setting ring and connected thereto.

3. In a camera, a photographic exposure control mechanism according to claim 1 further comprising a third setting ring, said third ring having circumferentially disposed gears at its inner periphery, and wherein said movable shaft has circumferentially disposed gears at its outer periphery, said shaft and said third setting ring being in meshed engagement.

4. An apparatus as in claim 1, wherein said rotation controlling means include a third setting ring for establishing a desired light value setting, and gear means connecting said third ring to said sleeve for rotation of said sleeve with said third ring so as to axially move said sleeve with respect to said rod, and wherein said indicating means include an on-position indicator responsive to the axial position of said sleeve whereby upon said third ring being set to a desired light value, said first and second rings can be adjusted to cause said sleeve to move an amount sufficient for said indicator to read the on-position, and thus produce a composite setting of the exposure factors corresponding to the selected light value.

5. An apparatus as in claim 1, wherein said coupling means include gear means on the outer surface of said rod and connected to said second ring for transmitting rotary motion from said second ring to said threaded sleeve whereby said sleeve is axially moved with respect to said rod and imparts motion to said indicating means.

6. An apparatus as in claim 1, wherein said first setting means include an aperture control in said housing for response to the position of said first setting ring.

7. An apparatus as in claim 5, wherein said second setting means includes a shutter time control.

8. In a camera, photographic exposure control apparatus comprising a housing, first exposure factor setting means including a first ring rotatably mounted on said housing, second exposure factor setting means including a second ring rotatably mounted on said housing coaxial with said first setting ring, rotatable cylinder cam means connected to one of said setting rings and responsive to rotation thereof, follower means in engagement with said cam means for axial motion parallel to the axes of said rings and connected to the other of said setting rings for rotary movement in response to rotation of said other ring, sleeve means threadably connected to said follower means for axial movement in response to rotary and axial movement of said follower means and means operatively associated with said sleeve means for indicating the composite light values set in the exposure mechanism of said camera.

9. In a camera, a photographic exposure control mechanism comprising a shutter speed setting ring rotatably mounted in said camera, a lens aperture setting ring rotatably mounted coaxial with said shutter speed setting ring, a cylinder cam surface connected to an edge of one of said setting rings and responsive to rotation thereof, a follower pin in engagement with said cam surface movable transverse to the plane of rotation of said rings, a plurality of threads on said pin, a threaded sleeve on said pin axially movable as a result of rotation of said sleeve and longitudinally movable with said pin, gear means secured on said pin for rotating said pin in response to rotation of the other of said rings, and means responsive to the axial movement of said sleeve for indicating the total light value set into the exposure control mechanism.

References Cited in the file of this patent

UNITED STATES PATENTS

| | | |
|---|---|---|
| 2,117,429 | Kuppenbender | May 17, 1938 |
| 2,186,616 | Mihalyi | Jan. 9, 1940 |
| 2,252,573 | Leitz | Aug. 12, 1941 |
| 2,467,946 | Rossman | Apr. 19, 1949 |
| 2,612,091 | Weiss | Sept. 30, 1952 |
| 2,887,026 | Rentschler | May 19, 1959 |

FOREIGN PATENTS

| | | |
|---|---|---|
| 756,282 | Germany | Feb. 23, 1953 |
| 1,120,299 | France | Apr. 16, 1956 |